United States Patent
Ikegami et al.

(10) Patent No.: US 9,869,788 B2
(45) Date of Patent: Jan. 16, 2018

(54) SEISMIC DETECTOR

(71) Applicant: Schlumberger Technology Corporation, Sugar Land, TX (US)

(72) Inventors: Toru Ikegami, Machida (JP); Ryo Imai, Sagamihara (JP); Takashi Yoshikawa, Sagamihara (JP)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 21 days.

(21) Appl. No.: 14/805,475

(22) Filed: Jul. 22, 2015

(65) Prior Publication Data

US 2016/0033665 A1 Feb. 4, 2016

Related U.S. Application Data

(60) Provisional application No. 62/030,083, filed on Jul. 29, 2014.

(51) Int. Cl.
*G01V 1/52* (2006.01)
*G01V 1/42* (2006.01)

(52) U.S. Cl.
CPC ................... *G01V 1/42* (2013.01)

(58) Field of Classification Search
CPC ........................................ G01V 1/42
USPC ........................................ 367/25
See application file for complete search history.

(56) References Cited

U.S. PATENT DOCUMENTS

| | | | | |
|---|---|---|---|---|
| 4,120,353 A | * | 10/1978 | Roesner | G01V 11/005 166/113 |
| 4,563,757 A | * | 1/1986 | Decorps | E21B 17/1021 181/104 |
| 5,044,461 A | * | 9/1991 | Aronstam | G01V 1/184 175/50 |
| 5,810,080 A | | 9/1998 | Meynier | |
| 6,817,238 B2 | * | 11/2004 | Go Boncan | G01N 33/383 73/149 |
| 6,990,045 B2 | * | 1/2006 | Jackson | G01V 1/52 166/250.01 |
| 7,048,089 B2 | | 5/2006 | West et al. | |
| 7,336,562 B1 | * | 2/2008 | Hoyle | G01V 1/523 181/102 |
| 8,061,470 B2 | | 11/2011 | Endo et al. | |
| 9,121,225 B2 | * | 9/2015 | Gregory | E21B 7/24 |
| 2005/0230973 A1 | * | 10/2005 | Fripp | E21B 41/0085 290/1 R |

* cited by examiner

*Primary Examiner* — Daniel L Murphy
(74) *Attorney, Agent, or Firm* — Trevor G. Grove

(57) ABSTRACT

A technique facilitates seismic wave detection with a seismic receiver. The seismic receiver has a tool body, a vibrationally isolated sensor package mounted in the tool body, and a plurality of contact shoes. The contact shoes are mounted around the sensor package in a distribution which enables three-point contact with a surrounding wellbore wall regardless of the azimuthal orientation of the sensor package.

15 Claims, 3 Drawing Sheets

SEISMIC DETECTOR

BACKGROUND

Hydrocarbon fluids are obtained from subterranean geologic formations. A variety of seismic tools and techniques are employed to evaluate the subterranean geologic formations and the potential for recovering hydrocarbon fluids. In many types of applications, seismic tools use an array of seismic receivers to detect seismic waves traveling through a given subterranean geologic formation. The seismic waves may be generated by a variety of surface and/or subsurface seismic sources, and the seismic receivers contain sensors which are constructed to detect the seismic waves. The seismic receivers are oriented in a specific azimuthal direction to enable detection of the seismic waves.

SUMMARY

In general, a system and methodology are provided for seismic wave detection with a seismic receiver or receivers. The seismic receiver has a tool body, a sensor package mounted in the tool body, and a plurality of contact shoes. The contact shoes are mounted around the sensor package in a distribution which enables three-point contact with a surrounding wellbore wall regardless of the azimuthal orientation of the sensor package. Additionally, the sensor package may be vibrationally isolated from the tool string delivering the seismic receiver downhole.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology related to seismic detection. The system and methodology may be used in a variety of applications, including applications in the oil and gas industry. A seismic receiver or a plurality of seismic receivers may be deployed in a borehole, e.g. a wellbore, to obtain information about seismic events. In oil and gas applications, for example, each seismic receiver may be used during production of a well or at other operational stages.

In some applications, the seismic receiver or receivers may be used at desired borehole positions to obtain seismic data which can be utilized to determine subsurface stratigraphy and to refine surface seismic data. By way of further example, micro seismic data may be generated via induced or natural formation fracturing which may be detected and transmitted for analysis by the seismic receivers. Each seismic receiver may comprise individual or plural sensors, such as geophones, geophone accelerometers, hydrophones, and/or other types of sensors.

According to an embodiment, the seismic receiver is employed for seismic wave detection and has a tool body and a sensor package mounted in the tool body. A plurality of contact shoes is operationally coupled with the sensor package and a corresponding sensor (or sensors) is located in the sensor package. The contact shoes are mounted around the sensor package in a distribution which enables three-point contact with a surrounding wellbore wall regardless of the azimuthal orientation of the sensor package. The three-point contact facilitates detection of seismic waves traveling through the surrounding formation. Additionally, the sensor package may be vibrationally isolated from the tool body.

Figure 1:
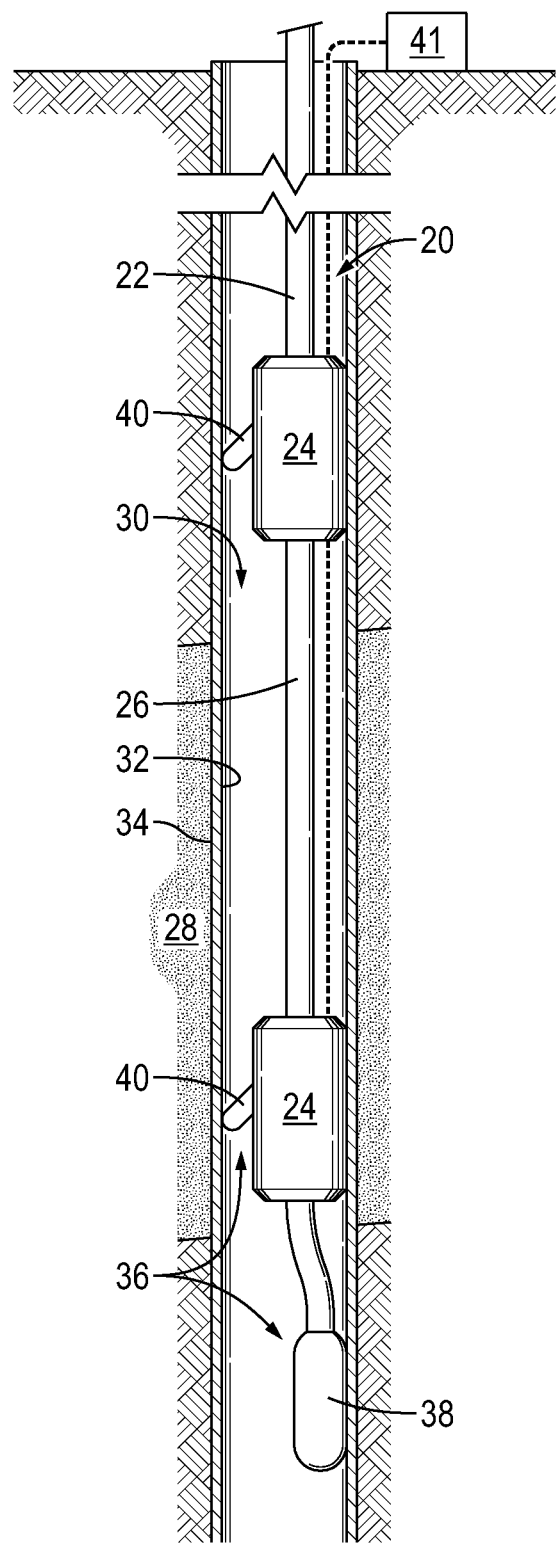
FIG. 1 is a schematic illustration of a seismic receiver array deployed in a wellbore formed through a subterranean formation, according to an embodiment of the disclosure.

Referring generally to FIG. 1, an embodiment of a system 20 for seismic detection is illustrated. In this embodiment, the system 20 comprises a tool string 22 with at least one seismic receiver 24. For example, a plurality of seismic receivers 24 may be positioned along the tool string 22. In some applications, numerous seismic receivers 24 are positioned along the tool string 22 and deployed as an array along a wellbore or other region. The seismic receiver(s) 24 may be mounted along a conveyance 26, such as a cable conveyance or a tubing conveyance. In some embodiments, segments of the conveyance 26 connect multiple seismic receivers 24. In other embodiments, the seismic receivers 24 may be mounted along a continuous conveyance 26.

The system 20 and seismic receivers 24 may be deployed to a subterranean location 28 for detection of seismic waves. For example, the seismic receivers 24 may be deployed down along a wellbore 30 extending into or through the subterranean location 28. The wellbore 30 is defined by a wellbore wall 32 and in some applications the wellbore wall 32 is formed by a casing 34 lining the wellbore 30. A positioning member 36 is useful in biasing each of the seismic receivers 24 against the casing 34 or against another type of wellbore wall 32. The positioning member 36 may comprise a system positioning member 38 and/or individual seismic receiver positioning members 40 associated individually with corresponding seismic receivers 24. Depending on the application, the system 20 may or may not use individual positioning members 40 and may or may not use system positioning member 38. The positioning member 36 moves the seismic receiver or receivers 24 into engagement with the wellbore wall 32 so as to enable detection of seismic waves with sufficient quality.

By way of example, the system positioning member 38 may comprise a weight and/or a coupling mechanism constructed to pull the conveyance 26 and the associated seismic receivers 24 against the wellbore wall 32. Furthermore, positioning member 38 may comprise mechanical systems, electromagnetic systems, or other suitable systems to bias the seismic receivers 24 toward surrounding wall 32. Similarly, the individual seismic receiver positioning members 40 may comprise a variety of positioning members, including mechanical members, e.g. mechanical arms, bow springs, other spring members, magnetic members, e.g. electromagnetic members, or other suitable positioning members designed to bias each seismic receiver against the casing 34 or other wellbore wall 32. Thus, the positioning members 38, 40 may employ mechanical force, magnetic force, and/or other force generating techniques to move the seismic receivers 24 against wall 32.

As described in greater detail below, the seismic receivers 24 are constructed in a manner which allows the positioning member 36 to bias and move the seismic receivers 24 into stable, coupling engagement with the wellbore wall 32 in an arbitrary direction. In other words, the seismic receivers 24 do not have to be rotationally aligned when biased into engagement with the surrounding wellbore wall 32. This capability dramatically simplifies the positioning of the seismic receivers 24 along wellbore wall 32 which, in turn, simplifies the collection of seismic wave data for transfer to a processing system 41. The processing system 41 may be located at the surface or at another suitable location.

Figure 2:
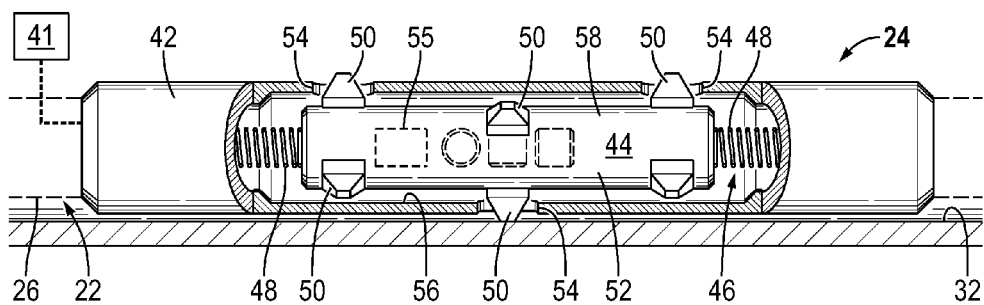
FIG. 2 is a front view of an example of a seismic receiver deployed against a wellbore wall, according to an embodiment of the disclosure.

Referring generally to FIG. 2, an example of one of the seismic receivers 24 is illustrated. Seismic receivers 24 are each constructed to enable coupling with the surrounding wellbore wall 32 in arbitrary rotational directions while achieving isolation from irrelevant vibration. In this example, each seismic receiver 24 comprises a tool body 42 and a sensor package 44 positioned in the tool body 42. In some embodiments, the sensor package 44 may be positioned coaxially within the tool body 42 prior to subjecting the sensor package 44 to a lateral bias.

As illustrated, the seismic receiver 24 further comprises an isolation system 46 which couples the sensor package 44 to the tool body 42 while isolating the sensor package 44 from unnecessary vibration, such as vibration propagating along the tool string 22 or vibration generated by the tool body 42. By way of example, the isolation system 46 may comprise an isolation spring system having a plurality of isolation springs 48 which couple the sensor package 44 to the tool body 42. The isolation springs 48 may comprise a variety of types of springs, such as coiled springs, leaf springs, electromagnetic forces which act as springs, or other suitable mechanisms. In some applications, the springs 48 are coupled to each axial end of the sensor package 44 and further coupled to corresponding positions on the tool body 42.

Additionally, the isolation system 46 may be constructed to enable lateral motion of the sensor package 44 with respect to the tool body 42. In such embodiments, the isolation system 46, e.g. isolation springs 48, allows lateral, e.g. radial, motion of the sensor package 44 with respect to the tool body 42 in arbitrary directions. In other words, the relative radial motion of the sensor package 44 with respect to the tool body 42 can occur regardless of the orientation of the seismic receiver 24.

Referring again to the embodiment illustrated in FIG. 2, the seismic receiver 24 further comprises a plurality of contact shoes 50 for detecting seismic waves. The contact shoes 50 are mounted to the sensor package 44 and are distributed along an exterior 52 of the sensor package 44 so as to establish three-point contact with the wellbore wall 32 when the seismic receiver 24 is biased against the wellbore wall 32 via positioning member 36. The contact shoes 50 are distributed along the exterior 52 so that the three-point contact with wellbore wall 32 is established regardless of the azimuthal orientation of the sensor package 44 and the seismic receiver 24.

To facilitate seismic monitoring, the contact shoes 50 may be constructed in a variety of forms, including conventional contact shoe forms, suitable for detecting the seismic waves moving through the wellbore wall 32. The isolation system 46, e.g. isolation springs 48, also may be constructed to provide a lateral or radial bias which ensures stable coupling between the sensor package 44 and the wellbore wall 32. In such applications, the isolation system 46 may be used to provide a bias which helps hold the three-point contact between the contact shoes 50 and the wellbore wall 32 when the seismic receiver 24 is biased against the wellbore wall.

In the illustrated example, the tool body 42 is constructed with a plurality of tool body windows 54. The windows 54 are positioned to receive corresponding contact shoes 50 therethrough. In the embodiment of FIG. 2, sufficient space is provided between sensor package 44 and the interior surface of tool body 42 so as to allow lateral movement of sensor package 44 with respect to tool body 42. Thus, the contact shoes 50 extend through corresponding windows 54 sufficiently to form the three-point contact with wellbore wall 32 when the seismic receiver 24 is moved against wellbore wall 32. As described above, the isolation system 46 may be used to help bias the sensor package 44 in a lateral direction to facilitate maintenance of a stable three-point contact between contact shoes 50 and wellbore wall 32 when the seismic receiver 24 is moved toward wellbore wall 32 by positioning member 36.

The seismic wave data detected by sensor package 44 via contact shoes 50 may be transmitted to processing system 41. In this example, the processing system 41 is coupled in communication with the sensor package 44 of each seismic receiver 24 to receive the seismic wave data detected by the plurality of contact shoes 50 placed in three-point contact with wellbore wall 32 at each seismic receiver 24. Sensor package 44 and processing system 41 may communicate via a variety of telemetry systems. For example, wired telemetry systems or wireless telemetry systems, e.g. acoustic telemetry systems, other pulse-type telemetry systems, electromagnetic systems, and fiber optical systems, may be used to transmit signals to processing system 41. In some applications, processing system 41 also may be able to transmit signals downhole to the seismic receivers 24 and/or other downhole components. It should further be noted that in some embodiments data obtained via contact shoes 50 is pre-processed by a signal processing circuit 55. The signal processing circuit 55 may be located in the sensor package 44, at other locations in the seismic receiver 24, or at other suitable locations depending on the construction of the overall system. In various applications, the signal processing circuit 55 may effectively be a separate component of the overall processing system 41.

The tool body 42 and the sensor package 44 may be constructed in a variety of shapes and configurations. In many applications, movement of the seismic receivers 24 along a wellbore is facilitated by constructing the tool body 42 in a generally cylindrical shape. In this type of embodiment, an interior 56 of tool body 42 also may be generally cylindrical, e.g. circular in cross-section, to receive a generally cylindrical sensor package 44. For example, the sensor package 44 may comprise a housing 58 with exterior 52 having a generally cylindrical shape from which contact shoes 50 extend.

Figure 3:
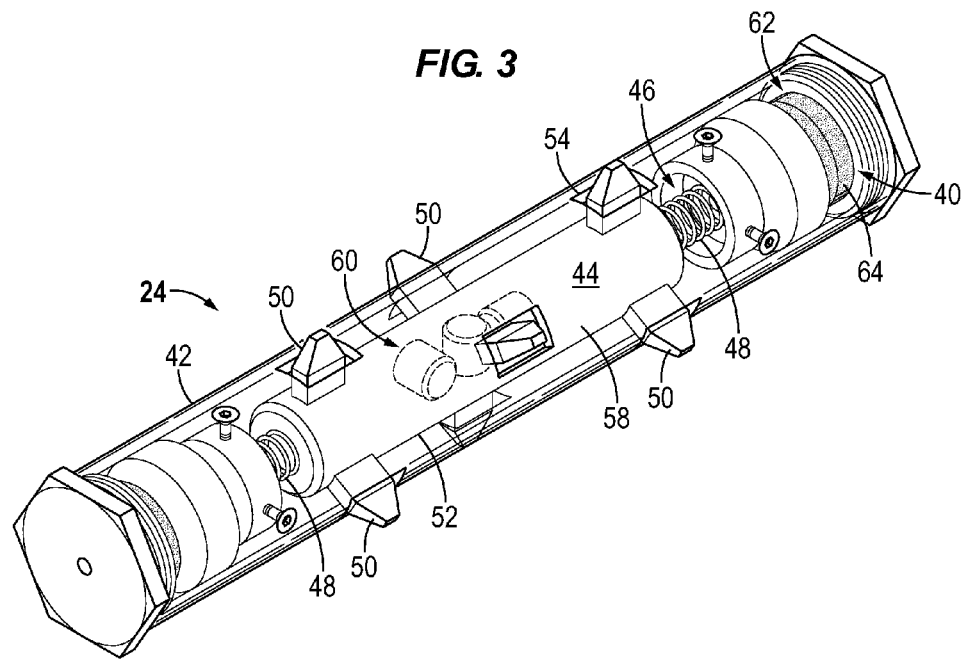
FIG. 3 is an illustration of an example of a seismic receiver which shows examples of internal sensors and other components, according to an embodiment of the disclosure.

As further illustrated in FIG. 3, embodiments of seismic receiver 24 may comprise additional and/or other components. For example, sensor package 44 may comprise a plurality of seismic sensors 60. Examples of seismic sensors comprise individual or plural sensors, such as geophones, geophone accelerometers, hydrophones, and/or other types of sensors. Each of the seismic sensors 60 is operatively engaged with the contact shoes 50 which detect the seismic waves via their three-point contact with the surrounding wellbore wall 32. The seismic waves experienced by the contact shoes 50 are monitored by the corresponding sensors 60. The sensors 60, in turn, transmit seismic wave data (or work in cooperation with a telemetry system to transmit seismic wave data) to processing system 41 for analysis.

In the embodiment illustrated in FIG. 3, isolation springs 48 are illustrated as coil springs, but the sensor package 44 may be mounted within tool body 42 via, leaf springs, springs created by electromagnetic force, and/or other types of springs which are able to effectively isolate the sensor package 44 from unwanted vibration occurring in or acting on tool body 42. In this example, the seismic receiver 24 also may comprise a clamping mechanism 62 which functions as an embodiment of positioning member 40. By way of example, clamping mechanism 62 may comprise a magnet or a plurality of magnets 64 oriented to provide the desired clamping force in the form of a lateral magnetic force which pulls the tool body 42 toward the casing 34 or other type of wellbore wall 32.

Individual seismic receivers 24 or an array of seismic receivers 24 may be used in a variety of oil and gas industry applications. For example, an array of the seismic receivers 24 may be employed to obtain subsurface information which is used to optimize exploration, development, and/or production operations related to a corresponding oil and gas field. As described above, the array of seismic receivers 24 is sometimes deployed along tool string 22 within wellbore 30 to detect the seismic wave data.

The construction of seismic receiver 24 enables the coupling of individual seismic receivers or an array of seismic receivers 24 to the wellbore wall 32 in an arbitrary direction. The design of each seismic receiver 24 further facilitates isolation of the sensor package from irrelevant vibrations.

In some embodiments, springs 48 and/or other mechanisms may be used to help ensure the three-point contact between the contact shoes 50 and the surrounding wellbore wall 32 regardless of azimuthal orientation of the seismic receiver 24 and its corresponding sensor package 44. For example, the springs 48 may be used to maintain this secure coupling between the contact shoes 50 and the surrounding wellbore wall 32 by providing a biasing force when sensor package 44 is moved out of coaxial alignment with tool body 42. Thus, when the seismic receiver 24 is pressed against the wellbore wall 32 by the positioning member or members 40, the sensor package 44 and the corresponding contact shoes 50 are independently biased toward and against the wellbore wall 32 by the restoring force of the isolation springs 48. The force provided by the positioning member 40 and isolation springs 48 should be strong enough to provide stable contact between the contact shoes 50 and the borehole wall 32.

The springs 48 also isolate the sensor package 44 and its seismic sensors 60 from irrelevant vibrations, such as vibrations traveling along tool string 22. Depending on the application, the isolation springs 48 may comprise a variety of forms and constructions able to both isolate the sensor package 44/sensors 60 and to provide the lateral biasing force which maintains stable contact between the contact shoes 50 and the wellbore wall 32.

Figure 4:
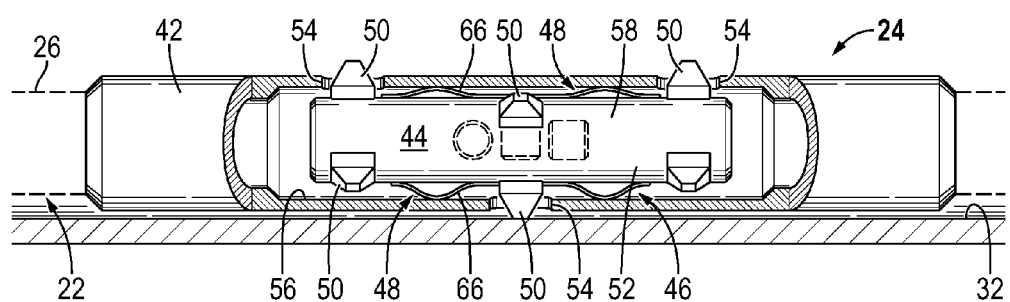
FIG. 4 is an illustration of an example of a seismic receiver which shows examples of internal sensors and other components, according to an embodiment of the disclosure.

Referring generally to FIG. 4, for example, another embodiment is illustrated in which the isolation springs 48 of isolation system 46 may comprise a laterally mounted member or members 66. In this embodiment, the laterally mounted members 66 are positioned laterally of the sensor package 44 at a position radially between sensor package 44 and tool body 42 rather than between the axial ends of the sensor package 44 and tool body 42. The laterally mounted members 66 may comprise a variety of springs 48 or other structures which maintain the secure coupling between contact shoes 50 and the surrounding wellbore wall 32 while also vibrationally isolating the sensor package 44 as described above.

In a specific embodiment, the laterally mounted members 66 comprise wave springs mounted between the exterior 52 of sensor package 44 and the interior surface of tool body 42. However, laterally mounted members 66 may comprise other isolation springs 48, such as laterally mounted coil springs, resilient materials, compression spring members, and tension spring members, and/or other types of resiliently supporting structures. In some applications, the isolation system 46 may comprise both axially positioned and laterally positioned springs 48.

The technique described herein may be employed in many types of wells having a variety of boreholes. The wells may comprise deviated boreholes, single boreholes, multiple boreholes, as well as many arrangements and sizes of boreholes. The individual seismic receivers 24 or an array of seismic receivers 24 also may be used in various other types of subterranean passages or spaces. Depending on the application, the construction and size of the seismic receivers as well as the materials used in constructing the seismic receivers may vary according to the parameters of a given application. Similarly, the types of seismic sensors 60, telemetry systems, isolation systems, biasing systems, conveyance systems, and/or other components used in forming overall system 20 may vary substantially depending on the specifics of a given environment and/or application.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for seismic detection, comprising:
   a tool string; and
   a plurality of seismic receivers positioned along the tool string, each seismic receiver comprising:
      a tool body;
      a sensor package coaxially placed in the tool body;
      an isolation spring system coupling the sensor package to the tool body, wherein the isolation spring system is adjacent a clamping mechanism that comprises at least one magnet located in the tool body; and
      a plurality of contact shoes for detecting seismic waves, the plurality of contact shoes being mounted to the sensor package and distributed along an exterior of the sensor package to establish three-point contact with a subterranean wall regardless of azimuthal orientation of the sensor package.

2. The system as recited in claim 1, wherein the isolation spring system comprises springs coupled to each axial end of the sensor package and coupled to the tool body.

3. The system as recited in claim 1, wherein the isolation spring system comprises a laterally mounted member positioned radially between the sensor package and the tool body.

4. The system as recited in claim 1, further comprising a positioning member associated with each seismic receiver to bias each seismic receiver against the subterranean wall.

5. The system as recited in claim 1, wherein the tool body has a plurality of windows through which the plurality of contact shoes extends.

6. The system as recited in claim 1, further comprising a processing system coupled in communication with the sensor package of each seismic receiver to receive seismic wave data detected by the plurality of contact shoes.

7. The system as recited in claim 1, further comprising a processing system to process data received via the plurality of contact shoes, at least a portion of the processing system being located in the seismic receiver.

8. A method, comprising:
forming a seismic receiver with a tool body, a sensor package mounted in the tool body, and a plurality of contact shoes mounted around the sensor package in a distribution which enables three-point contact with a surrounding wellbore wall regardless of azimuthal orientation of the sensor package;
vibrationally isolating the sensor package from the tool body, using an isolation spring system coupling the sensor package to the tool body, wherein the isolation spring system is adjacent a clamping mechanism that comprises at least one magnet;
delivering the seismic receiver downhole via a tool string; and
biasing the sensor package toward the surrounding wellbore wall to establish the three-point contact between the plurality of contact shoes and the surrounding wellbore wall.

9. The method as recited in claim 8, further comprising obtaining seismic wave data via the plurality of contact shoes.

10. The method as recited in claim 9, wherein mounting comprises coupling at least one spring between each axial end of the sensor package and the tool body.

11. The method as recited in claim 8, wherein biasing comprises biasing the seismic receiver against the surrounding wellbore wall with a mechanical member.

12. The method as recited in claim 8, wherein delivering comprises delivering a plurality of seismic receivers downhole via the tool string.

13. A system, comprising
a seismic receiver having a tool body and a sensor package mounted in the tool body via an isolation system to isolate the sensor package from vibrational interference wherein the isolation system comprises a spring and is located with the body and connects the sensor package with the tool body, wherein the isolation spring system is adjacent a clamping mechanism that comprises at least one magnet located in the tool body, the seismic receiver further comprising a plurality of contact shoes to detect seismic data, the plurality of contact shoes extending from the sensor package in a manner able to establish three-point contact with a wellbore wall regardless of azimuthal orientation of the sensor package.

14. The system as recited in claim 13, further comprising a tool string, the seismic receiver being mounted in the tool string.

15. The system as recited in claim 13, wherein the isolation system comprises a plurality of springs coupled between the sensor package and the tool body.

* * * * *